(12) United States Patent
Shi

(10) Patent No.: US 12,258,030 B2
(45) Date of Patent: Mar. 25, 2025

(54) MANAGEMENT METHOD AND APPARATUS FOR VEHICLE SAFETY, AND COMPUTER STORAGE MEDIUM

(71) Applicant: PATEO CONNECT+ TECHNOLOGY (SHANGHAI) CORPORATION, Shanghai (CN)

(72) Inventor: Hongren Shi, Shanghai (CN)

(73) Assignee: PATEO CONNECT+ TECHNOLOGY (SHANGHAI) CORPORATION, Shanghai (CN)

( * ) Notice: Subject to any disclaimer, the term of this patent is extended or adjusted under 35 U.S.C. 154(b) by 39 days.

(21) Appl. No.: 17/773,299

(22) PCT Filed: Dec. 9, 2019

(86) PCT No.: PCT/CN2019/124107
§ 371 (c)(1),
(2) Date: Apr. 29, 2022

(87) PCT Pub. No.: WO2021/082194
PCT Pub. Date: May 6, 2021

(65) Prior Publication Data
US 2024/0157958 A1    May 16, 2024

(30) Foreign Application Priority Data
Oct. 30, 2019    (CN) .......................... 201911043704.6

(51) Int. Cl.
*B60W 50/14*    (2020.01)
*B60K 35/28*    (2024.01)
(Continued)

(52) U.S. Cl.
CPC ............. *B60W 50/14* (2013.01); *B60K 35/28* (2024.01); *G06Q 40/08* (2013.01); *G06V 10/70* (2022.01);
(Continued)

(58) Field of Classification Search
CPC ........... B60W 50/14; B60W 2050/146; B60W 2420/403; B60W 2555/20;
(Continued)

(56) References Cited

U.S. PATENT DOCUMENTS 4,766,539 A * 8/1988 Fox ........................ G06Q 40/02
705/4
9,183,176 B2    11/2015 Lee et al.
(Continued)

FOREIGN PATENT DOCUMENTS

| CN | 104834912 | 8/2015 |
| CN | 105196910 | 12/2015 |

(Continued)

OTHER PUBLICATIONS

Partial Supplementary European Search Report for Application No. 19950670.0, mailed Sep. 25, 2023 (13 pages).
(Continued)

*Primary Examiner* — Curtis J King
(74) *Attorney, Agent, or Firm* — NIXON PEABODY LLP; Jeffrey L. Costellia

(57) ABSTRACT

A management method and apparatus for vehicle safety, and a computer storage medium. The method includes: acquiring at least one of meteorological data and environmental data, the environmental data is collected by an on-board device on a vehicle; determining a weather warning type based on at least one of the meteorological data and the environmental data; determining whether the weather warning type meets a predetermined warning condition; determining vehicle insurance data matched with the vehicle, based on at least one of the meteorological data and the environmental data as well as driving data of the vehicle; and displaying an identifier associated with the vehicle insurance data on at least one of a mobile device and an on-board display screen
(Continued)

of the vehicle, the mobile device is associated with the vehicle when a predetermined operation is detected on the mobile device.

14 Claims, 10 Drawing Sheets

(51) Int. Cl.
  *G06Q 40/08* (2012.01)
  *G06V 10/70* (2022.01)
  *G06V 20/56* (2022.01)

(52) U.S. Cl.
  CPC ...... *G06V 20/588* (2022.01); *B60K 2360/119* (2024.01); *B60K 2360/166* (2024.01); *B60K 2360/178* (2024.01); *B60K 2360/577* (2024.01); *B60W 2050/146* (2013.01); *B60W 2420/403* (2013.01); *B60W 2555/20* (2020.02); *B60W 2556/10* (2020.02)

(58) Field of Classification Search
  CPC ... B60W 2556/10; B60W 40/02; B60K 35/28; B60K 2360/119; B60K 2360/166; B60K 2360/178; B60K 2360/577; G06Q 40/08; G06Q 50/265; G06Q 50/40; G06V 10/70; G06V 20/588; G08G 1/0112; G08G 1/0133; G08G 1/04; G08G 1/096766; G08G 1/0967; G08B 21/10
  See application file for complete search history.

(56) References Cited

U.S. PATENT DOCUMENTS

| | | | | |
|---|---|---|---|---|
| 9,495,709 | B2* | 11/2016 | Borden | G06Q 10/10 |
| 10,354,455 | B1* | 7/2019 | Chan | G08G 1/146 |
| 10,373,259 | B1* | 8/2019 | Konrardy | G06Q 40/08 |
| 10,431,018 | B1* | 10/2019 | Fields | G06Q 30/0217 |
| 10,825,098 | B1* | 11/2020 | Bueche, Jr. | G06Q 40/08 |
| 11,036,221 | B1* | 6/2021 | Lyle | G05D 1/0088 |
| 11,216,782 | B2* | 1/2022 | Randall | G06Q 30/018 |
| 12,014,422 | B1* | 6/2024 | Madigan | G06Q 40/08 |
| 2004/0039609 | A1* | 2/2004 | Burkitt | G06Q 40/08 705/4 |
| 2011/0161118 | A1* | 6/2011 | Borden | G06Q 50/22 705/4 |
| 2019/0304026 | A1* | 10/2019 | Lyman | G06Q 40/08 |
| 2021/0133886 | A1* | 5/2021 | Williams | G06Q 40/08 |
| 2023/0140630 | A1* | 5/2023 | Shimizu | G06Q 40/08 705/4 |

FOREIGN PATENT DOCUMENTS

| | | |
|---|---|---|
| CN | 105405306 | 3/2016 |
| CN | 105651293 | 6/2016 |
| CN | 107909839 | 4/2018 |
| CN | 108909656 | 11/2018 |
| CN | 108924253 | 11/2018 |
| CN | 109325856 | 2/2019 |
| CN | 109326134 | 2/2019 |
| CN | 109617942 | 4/2019 |

OTHER PUBLICATIONS

Chinese Office Action for Application No. 201911043704.6, mailed Sep. 30, 2021 (8 pages).
International Search Report for Application No. PCT/CN2019/124107, mailed Jul. 31, 2020 (6 pages).

* cited by examiner

MANAGEMENT METHOD AND APPARATUS FOR VEHICLE SAFETY, AND COMPUTER STORAGE MEDIUM

TECHNICAL FIELD

The present disclosure generally relates to the field of vehicle insurance and security, and more particularly relates to a management method and apparatus for vehicle safety, and a computer storage medium.

BACKGROUND

Suddenly experiencing severe weather, such as heavy precipitation, snowstorm, long hailstone attack, lightning strike and violent storm may usually bring damages to vehicles, and even bring personal safety threats to drivers and passengers of the vehicles.

In the traditional management solution for vehicle safety, vehicle owners usually buy insurance (such as vehicle insurance) in advance, but the purchased insurance generally has a certain validity period, and the compensation scope of the purchased insurance may not cover risks of the vehicles to the vehicle and the personnel safety due to suddenly experiencing the severe weather. For example, in a case of suffering sudden rainstorms, a plurality of vehicles traveling or stored outside are easily flooded by accumulated water, resulting in losses of different degrees. If the vehicle owner only purchased vehicle damage insurance and did not choose engine wading loss insurance based on the vehicle damage insurance, the vehicle owner may not get the corresponding compensation for the direct damage of the engine caused by the engine flooding. Moreover, in a case that the validity period of the vehicle insurance has expired, even if the vehicle owner foresees the potential safety hazards faced by the vehicle and the driver and passengers of the vehicle, the vehicle owner can't buy insurance in time.

Therefore, in the traditional management solution for vehicle safety, it is impossible to provide matching and timely warning and safety guarantee for a vehicle suddenly experiencing severe weather and personnel in the vehicle.

SUMMARY

The present disclosure provides a management method and apparatus for vehicle safety, and a computer storage medium, which can provide matching and timely warning and safety guarantee for a vehicle suddenly experiencing severe weather and personnel in the vehicle.

According to a first aspect of the present disclosure, a management method for vehicle safety is provided. The method includes: acquiring at least one of meteorological data and environmental data, the environmental data is collected by an on-board device on a vehicle; determining a weather warning type based on at least one of the meteorological data and the environmental data; in response to determining that the weather warning type meets a predetermined warning condition, determining vehicle insurance data matched with the vehicle, based on at least one of the meteorological data and the environmental data as well as driving data of the vehicle; and displaying an identifier associated with the vehicle insurance data on at least one of a mobile device and an on-board display screen of the vehicle, the mobile device is associated with the vehicle when a predetermined operation is detected on the mobile device.

According to a second aspect of the present disclosure, a management apparatus for vehicle safety is also provided, including: a memory configured for storing one or more computer programs; and a processor coupled to the memory and configured for executing the one or more programs to cause the apparatus to execute the method according to the first aspect of the present disclosure.

According to a third aspect of the present disclosure, a non-transitory computer-readable storage medium is provided. The non-transitory computer-readable storage medium stores a machine-executable instruction, and the machine-executable instruction, when executed, enables a machine to execute the method according to the first aspect of the present disclosure.

In some embodiments, the environmental data at least includes one of the following items: environmental video data collected by a camera device of the vehicle, the environmental video data at least includes window image data of the vehicle and external environmental image data of the vehicle; environmental humidity data detected via a humidity sensor of the vehicle; environmental air volume data detected via an air volume sensor of the vehicle; rainfall data detected via a wiper sensor of the vehicle; and environmental temperature data detected via a temperature sensor of the vehicle.

In some embodiments, the method further comprises: acquiring environmental video data of the vehicle via a streaming rearview mirror of the vehicle, wherein the environmental video data at least includes window image data of the vehicle and external environmental image data of the vehicle, and the streaming rearview mirror is connected to a plurality of camera devices of the vehicle.

In some embodiments, the identifier associated with the vehicle insurance data includes an operable icon for indicating a vehicle insurance type matched with the vehicle.

In some embodiments, the method further includes: in response to that an operation at the operable icon is detected, acquiring personal information of a user associated with the mobile device; generating order data associated with the vehicle insurance data, based on the personal information and the vehicle insurance data acquired; and sending the order data to a cloud server via the mobile device.

In some embodiments, the method further includes: in response to that an operation at the operable icon is detected, sending order data associated with the vehicle insurance data to a cloud server via the mobile device.

In some embodiments, the method further includes: at the mobile device, in response to determining that a distance of the mobile device relative to the vehicle is less than a predetermined value, acquiring the environmental data and the meteorological data for determining the weather warning type.

In some embodiments, the step of determining the weather warning type further includes: generating environmental image noise data, based on environmental image data of the vehicle; determining whether the weather warning type indicates one of a heavy rain, a heavy snow and a hailstone, based on a probability distribution of the environmental image noise data.

In some embodiments, the step of determining the weather warning type includes: generating a high-frequency image, based on at least one image data of the window image data and the external environmental image data of the vehicle, the high-frequency image includes high-frequency information in the at least one image data.

In some embodiments, the step of determining the weather warning type further includes: determining a rear ground image region of the vehicle, based on the external environmental image data of the vehicle; extracting an image feature of the rear ground image region of the vehicle; determining whether one of accumulated snow and accumulated water exists in the rear ground image region of the vehicle, based on the extracted image feature; in response to determining that one of the accumulated snow and the accumulated water exists in the rear ground image region of the vehicle, determining the weather warning type, based on the high-frequency image and at least one of the environmental temperature data and the environmental humidity data.

In some embodiments, the step of determining the weather warning type includes: selecting a plurality of groups of environmental image sequences in the environmental video data; determining a background object in the environmental image sequence, based on the plurality of groups of environmental image sequences; in response to determining that at least one of the following conditions is met, determining whether the weather warning type indicates a low visibility: an edge strength of the background object is lower than a first predetermined threshold; an image sharpness of the background object is lower than a second predetermined threshold, and the first predetermined threshold and the second predetermined threshold are determined based on historical image data associated with the background object; and a disappearing speed of the background object in the environmental image sequence is greater than a third predetermined threshold, and the third predetermined threshold is determined based on the historical image data associated with the background object and a driving speed of the vehicle.

In some embodiments, the method further includes: in response to confirming that the weather warning type indicates a heavy rain, determining whether a wading warning region exists in a route from a current location to a destination, the wading warning region is determined based on at least one of a geographic feature, a road attribute and historical data associated with the route; and in response to determining that the wading warning region exists in the route, displaying information for identifying a to-be-selected route between the current location and the destination on at least one of the mobile device and the on-board display screen of the vehicle.

In some embodiments, the method further includes: in response to that an operation regarding to the to-be-selected route, determining an expected time to arrive at the destination via the to-be-selected route, based on navigation information and traffic information received by the mobile device; presenting the expected time on at least one of the mobile device and the on-board display screen of the vehicle.

In some embodiments, the step of determining that the weather warning type meets the predetermined warning condition includes at least one of the following items: in response to determining that the weather warning type indicates at least one of low visibility, heavy snow, heavy rain, lightning, hailstone and freezing, determining that the weather warning type meets the predetermined warning condition, the low visibility includes at least one of haze and sandstorm; and in response to determining that a current weather warning type relative to a change of the weather warning type in the past predetermined time interval meets a first predetermined condition, determining that the weather warning type meets the predetermined warning condition.

The summary part is provided to introduce the selection of concepts in a simplified form, which will be further described in the following detailed description. The summary part is not intended to identify key features or main features of the present disclosure, and is also not intended to limit the scope of the present disclosure.

BRIEF DESCRIPTION OF THE DRAWINGS

In each drawing, the same or corresponding symbols represent the same or corresponding parts.

DETAILED DESCRIPTION

Figure 1:
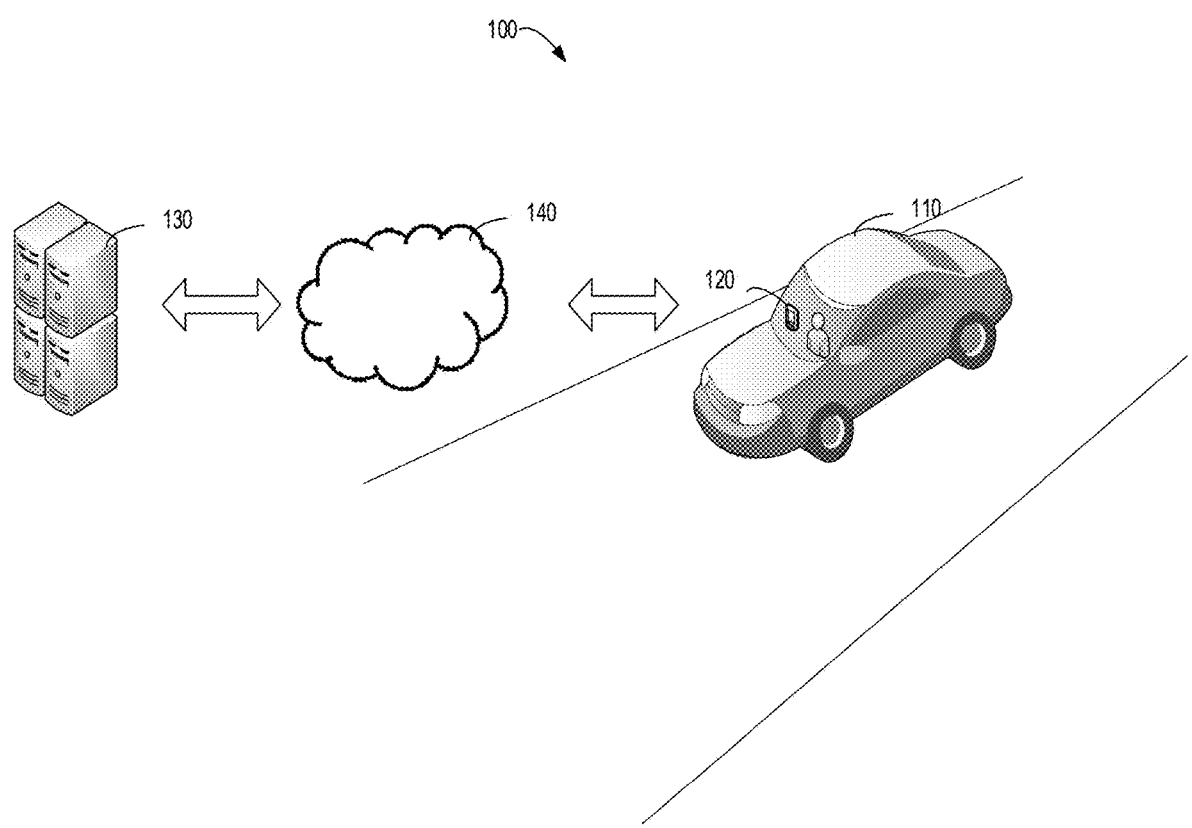
FIG. 1 illustrates a schematic diagram of a system 100 for a management method for vehicle safety according to an embodiment of the present disclosure.

The preferred embodiments of the present disclosure will be described in further detail hereinafter with reference to the drawings. Although the preferred embodiments of the present disclosure are shown in the drawings, it should be understood that the present disclosure may be embodied in various forms and should not be construed as limited to the embodiments set forth herein. On the contrary, these embodiments are provided to make the present disclosure more thorough and complete, and to fully convey the scope of the present disclosure to those skilled in the art.

The term "including" and similar terms thereof used herein represents open inclusion, which means, "including but not limited to". Unless specifically stated, the term "or" represents "and/or". The term "based on" represents "at least partially based on". The term "one exemplary embodiments" or "one embodiment" represent "at least one exemplary embodiment". The term "another embodiment" represents at least one other embodiment. The terms "first", "second", or the like, may refer to different or identical objects. Other explicit and implicit definitions may be probably included below.

As described above, in the traditional solution of the management method for vehicle safety, if a user (such as the vehicle owner) purchases vehicle insurance with a certain validity period in advance, it may be impossible to provide matching and timely warning and safety guarantee for a vehicle suddenly experiencing severe weather and personnel in the vehicle because a claim scope of the purchased insurance does not match the situation when the vehicle suddenly experiences severe weather, and the validity period of the purchased insurance has expired, and the like.

To at least partially solve one or more of the above problems and other potential problems, the exemplary embodiments of the present disclosure propose a vehicle safety management solution. The solution includes: acquiring at least one of meteorological data and environmental data, the environmental data being collected by means of an on-board device on a vehicle; based on at least one of the meteorological data and the environmental data, determining a weather warning type; in response to determining that the weather warning type meets a predetermined warning condition, based on at least one of the meteorological data and the environmental data and driving data of the vehicle, determining vehicle insurance data matched with the vehicle; and displaying an identifier associated with the vehicle insurance data on at least one of a mobile device and an on-board display screen of the vehicle, the mobile device being associated with the vehicle via a detected predetermined operation on the mobile device.

In the foregoing solution, when the weather warning type is determined to meet the predetermined warning condition based on at least one of the meteorological data acquired and the environmental data collected at the vehicle, the insurance data is matched according to at least one of the indicated meteorological data and the actual environmental data and the driving data of the vehicle representing a vehicle condition, so that the determined insurance data can be matched with the actual severe weather situation suddenly experienced by the vehicle. In addition, by displaying the matching insurance identifier on at least one of the mobile device associated with the vehicle and the vehicle, a driver and a passenger of the vehicle can be warned by a signal related to the weather warning type, and it is beneficial for the user to quickly identify and issue insurance operations in the way of indicating or identifying instead of directly displaying the insurance data, without causing unnecessary interference to safe driving.

FIG. 1 illustrates a schematic diagram of a system 100 for a management method for vehicle safety according to an embodiment of the present disclosure. As shown in FIG. 1, the system 100 includes a vehicle 110, a mobile device 120, and a cloud server 130. The mobile device 120 and the server 130 are connected through a network 140. In some embodiments, the system 100 further includes a RSU (Road Side Unit, not shown), and the like.

The vehicle 110 at least includes: an on-board computer, an on-board data sensing device, and an on-board T-BOX. The on-board data sensing device is configured for sensing data of the vehicle and data of an external environment where the vehicle is located in real time.

The on-board T-BOX is configured for data interaction among the on-board computer, the mobile device 120, the roadside unit and the cloud server 130. The on-board T-BOX includes an SIM card, a GPS antenna, a 4G or 5G antenna, and the like. When a user sends a control command (starting the vehicle remotely, turning on an air conditioner, adjusting a seat to a proper position, and the like) through an APP (Application) of the mobile device 120 (e.g., mobile phone), a TSP background will send a monitoring request command to the on-board T-BOX. After the vehicle receives the control command, a control message is sent through a CAN bus to control the vehicle, and finally an operation result is fed back to the mobile phone APP of the user. The on-board T-BOX communicates with the on-board computer through canbus to realize data interaction, such as transmitting vehicle status information, key status information, control instructions, or the like. The on-board T-BOX can collect bus data related to buses Dcan, Kcan and PTcan of the vehicle 110.

The data of the vehicle sensed by the on-board data sensing device includes, for example, a driving speed, an accelerated velocity, a yaw rate, and a location of the vehicle. The external environment data sensed by the on-board data sensing device includes, for example, temperature, humidity, light, distance, and the like. The data sensing device for sensing the external environment data includes, for example, a humidity sensor 21 for detecting environmental humidity data, an air volume sensor for detected environmental air volume data, a wiper sensor for detected rainfall data, a temperature sensor for detected environmental temperature data, and a plurality of cameras for collecting environmental video data. The data sensing device for sensing the external environment data further includes camera devices of the vehicle 110, for example, a plurality of camera devices connected with a streaming rearview mirror. In some embodiments, the environmental video data collected by the streaming rearview mirror through a front camera and a rear camera connected with the streaming rearview mirror at least includes window image data of the vehicle and external environmental image data of the vehicle (for example, an environmental image at a rear of the vehicle).

The vehicle 110 and the mobile device 120 can interact and share data through wireless communication means such as Wi-Fi, Bluetooth, and cellular. For example, the mobile device 120 is associated with the vehicle through that a predetermined operation is detected (e.g., shaking) on the mobile device. By associating the mobile device 120 with the vehicle by the predetermined operation (such as shaking), a connection between the vehicle and an associated mobile device of a specific user (such as the vehicle owner) may be established in a safe manner, thus facilitating sharing of data and computing resources. The vehicle 110 may send the data of the vehicle and the external environment data (for example, including environmental video data) collected by the data sensing device of the vehicle to the mobile device 120 after detecting that a distance of the mobile device 120 relative to the vehicle 110 is less than a predetermined value (for example, but not limited to, detecting that the mobile device 120 is inside the vehicle 110 or within a few meters outside the vehicle). By adopting the above means, unnecessary data interaction between the vehicle and the mobile device can be reduced. In some embodiments, when it is detected that the mobile device 120 is inside the vehicle 110, the on-board computer and the mobile phone may be interconnected through a USB communication technology.

Real-time data interaction is performed between the vehicle 110 and the cloud server 130 through wireless communication technologies such as satellite wireless communication or mobile cellular. For example, the vehicle 110 directly acquires real-time meteorological data from the cloud server 130, or interacts insurance data with the cloud server 130 directly or via the mobile device 120.

The mobile device 120, is, for example, but not limited to a mobile phone. The terminal device 120 may directly carry out data interaction with the on-board T-BOX. In some embodiments, the mobile device 120 may be a tablet computer. At the mobile device 120, when it is confirmed that the distance of the mobile device relative to the vehicle is less than the predetermined value, the data of the vehicle, the environmental data and the meteorological data meteorological data may be acquired to determine a weather warning type at the mobile device 120, and when it is determined that the weather warning type meets a predetermined warning condition, matching vehicle insurance data is determined. By adopting the above means, stronger computing resources of the mobile device 120, a more convenient communication capability between the mobile device 12 and the cloud server (or an IoV platform), and a better compatibility between the cloud server (or IoV platform) and a third-party application can be fully used to calculate the weather warning type and the matching vehicle insurance data, as well as interact the vehicle insurance data, thus reducing a computational burden of the on-board computer and limitations caused by configuration.

Figure 2:
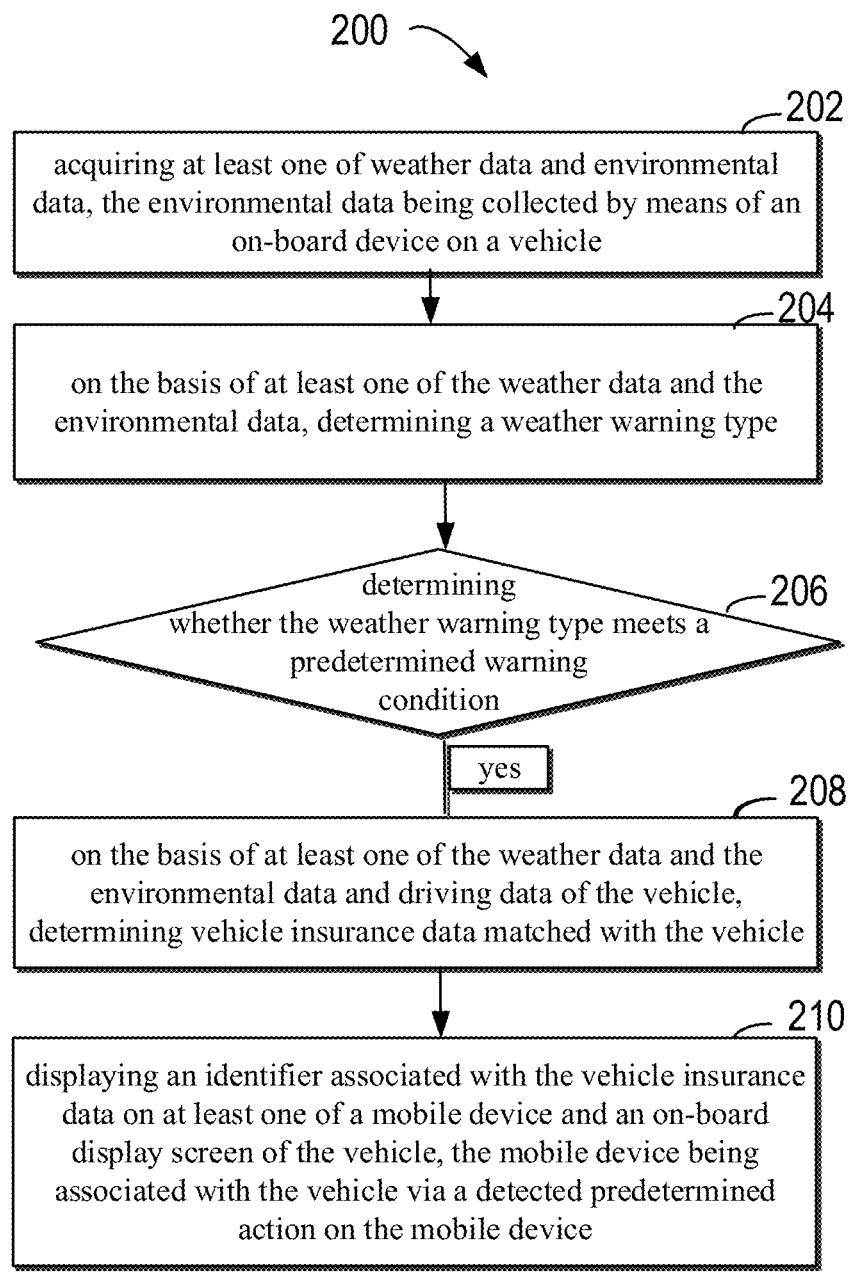
FIG. 2 illustrates a flow chart of a management method for vehicle safety according to an embodiment of the present disclosure.

The management method for vehicle safety according to an embodiment of the present disclosure will be described below with reference to FIG. 2. FIG. 2 illustrates a flow chart of the management method for vehicle safety 200 according to the embodiment of the present disclosure. It should be understood that the method 200, for example, may be performed at an electronic device 1000 described in FIG. 10. The method may also be executed at the mobile device 120 described in FIG. 1 or at the on-board computer of the vehicle 110. It should be understood that the method 200 may further include additional actions which are not shown and/or the illustrated actions may be omitted, and the scope of the present disclosure is not limited in this respect.

At box 202, the mobile device 120 or the on-board computer of the vehicle 110 may acquire at least one of meteorological data and environmental data. The environmental data is collected by the on-board device on the vehicle. In some embodiments, at the mobile device 120, in response to determining that a distance of the mobile device relative to the vehicle is less than a predetermined value, the environmental data and the meteorological data are acquired for the weather warning type. In some embodiments, the environmental data at least includes one of the following: environmental video data collected by a camera device of the vehicle, the environmental video data at least including window image data of the vehicle and external environmental image data of the vehicle; environmental humidity data detected via a humidity sensor of the vehicle; environmental air volume data detected via an air volume sensor of the vehicle; rainfall data detected via a wiper sensor of the vehicle; and environmental temperature data detected via a temperature sensor of the vehicle. In some embodiments, the window image data of the vehicle and the external environmental image data of the vehicle are acquired via a streaming rearview mirror of the vehicle. The streaming rearview mirror, for example, is connected with a plurality of camera devices (for example, a front camera and a rear camera) of the vehicle. By adopting the streaming media image transmission mode, the environmental image data of the vehicle can be transmitted with high speed, low noise and high accuracy.

In some embodiments, the wiper sensor, for example, may be, but not limited to, an optical sensor or a capacitive sensor. For example, the wiper sensor in the form of optical sensor includes: a plurality of light emitting diodes and a reflected light receiver. The light emitting diodes and the reflected light receiver are disposed at an inner side of a front windshield, for example. When the plurality of light emitting diodes emit a plurality of beams of light, the light passes through the front windshield and is reflected to the reflected light receiver. When there are raindrops, snowflakes or hailstones on the front windshield, the light will deviate, and a signal received by the reflected light receiver will change in comparison to a signal received in fine weather. Based on the change of the received signal, the rainfall can be determined, for example, a number of raindrops per unit area can be determined. In some embodiments, the wiper sensor in the form of capacitive transducer, for example, uses a difference between a dielectric constant of the raindrops (e.g., the dielectric constant of the water is 80) and a dielectric constant of glass (e.g., the dielectric constant of the glass is 2) to determine rainfall data falling on the glass based on the change of the dielectric constant of the glass. Therefore, the mobile device 120 or the vehicle 110 can obtain the rainfall data of the wiper sensor and use the rainfall data to determine the weather warning type later.

At box 204, the mobile device 120 or the on-board computer of the vehicle 110 determines the weather warning type based on at least one of the meteorological data and the environmental data. The method for determining the weather warning type can be realized in various ways.

It should be understood that in severe weather, a resolution of a collected images is generally low, so the accuracy of using a general image-based machine learning algorithm to identify the weather is relatively low. After research, it is found that there is a difference in probability distribution between influences of the severe weather on the collected image data and general image data. The following describes the influence of the severe weather on the collected image data with reference to formula (1).

$$O=B+S \tag{1}$$

In the above formula (1), O represents an input image (e.g., window image data, and external environmental image data of the vehicle) with the influence of the severe weather. B represents an input image without the influence of the severe weather, and S represents image noise data caused by severe weather (such as low visibility, heavy snow, heavy rain, lightning, hailstone, and the like). Therefore, S in formula (1) may be understood as image noise data in a traditional sense. Therefore, the influence of the severe weather on the collected images may be regarded as the noise of the image data, and then the image noise data is effectively classified by a classification network, so as to determine the weather warning type efficiently.

In some embodiments, the method of determining the weather warning type, for example, includes: based on the environmental image data of the vehicle, generating, by the mobile device 120 or the on-board computer of the vehicle 110, the environmental image noise data; and based on a probability distribution of the environmental image noise data, determining whether the weather warning type indicates one of a heavy rain, a heavy snow and a hailstone. By using the environmental image data (such as window image noise data) of the vehicle to determine the weather warning type, not only the weather warning type be determined effectively. Moreover, compared with the general image-based weather recognition method, the low-resolution high-frequency image noise indicating the severe weather can be classified more effectively, and meanwhile, the calculation efficiency is improved obviously.

It should be understood that when a vehicle is suddenly attacked by heavy precipitation, snowstorm or hailstones, raindrops, snowflakes or hailstones with a certain density and a larger particle radius will appear in the window image of the vehicle. These raindrops, snowflakes or hailstones appearing on the window image constitute noise points of the window image data. Therefore, the raindrops, the snowflakes and the hailstones may be recognized by using the window image noise data, so as to recognize whether the current weather belongs to the weather warning type of heavy precipitation weather, snowstorm or hailstone. Because the image information indicated in the window image data is simpler than the image information indicated by the environmental image data of the vehicle, especially the front window image data which usually includes a road ahead and the vehicle, the calculation efficiency of using the window image data, especially the front window image data to identify the current weather type is higher.

The specific method of determining the weather warning type will be described below with reference to FIGS. 6 to 8, and will not be elaborated herein.

At box 206, the mobile device 120 or the on-board computer of the vehicle 110 determines whether the weather warning type meets a predetermined warning condition.

At box 208, if the mobile device 120 or the on-board computer of the vehicle 110 determines that the warning weather type meets the predetermined warning condition, the vehicle insurance data matched with the vehicle is determined based on at least one of the meteorological data and the environmental data and driving data of the vehicle.

In some embodiments, the step of determining whether the weather warning type meets the in some embodiments, for example, includes at least one of the following: if the mobile device 120 or the vehicle 110 determines that the weather warning type indicates at least one of low visibility, heavy snow, heavy rain, lightning, hailstone and freezing, determining that the weather warning type meets the predetermined warning condition, wherein the low visibility includes at least one of haze and sandstorm. Or, the mobile device 120 or the vehicle 110 determines that a current weather warning type relative to a change of the weather warning type in the past predetermined time interval meets a first predetermined condition. Or, the mobile device 120 or the vehicle 110 combines the above two situations to determine whether the current weather warning type belongs to warning weather needing to purchase insurance. By determining whether the current weather warning type changes suddenly, timely warning may be given for sudden severe weather so as to purchase insurance that matches the sudden severe weather type.

At box 210, an identifier associated with the vehicle insurance data is displayed on at least one of the mobile device 120 and an on-board display screen of the vehicle 110, the mobile device being associated with the vehicle through that a predetermined operation on the mobile device is detected. In some embodiments, the displayed identifier is configured for graphically prompting an insurance type, insurance benefits and expenses of a user, and the user may enjoy relevant insurance services only by simply confirming. For example, the identifier includes an operable icon for indicating a vehicle insurance type matched with the vehicle. For example, if it is determined that the severe weather type is heavy rain (i.e., heavy rainfall weather), the vehicle insurance data is, for example, recommended vehicle wading insurance, the identifier associated with the vehicle insurance data is, for example, an operable icon indicating vehicle wading. If it is determined that the severe weather type is snowstorm, the identifier associated with the vehicle insurance data is, for example, an operable icon indicating vehicle skidding and scratching. In some embodiments, the vehicle insurance data may be prompted by voice.

In the foregoing solution, when the weather warning type is determined to meet the predetermined warning condition based on at least one of the meteorological data acquired and the environmental data collected at the vehicle, the insurance data is matched according to at least one of the indicated meteorological data and the actual environmental data and the driving data of the vehicle representing a vehicle condition, so that the determined insurance data can be matched with the actual severe weather situation suddenly experienced by the vehicle. In addition, by displaying the matching insurance identifier on at least one of the mobile device associated with the vehicle and the vehicle, a driver and a passenger of the vehicle can be warned by a signal related to the weather warning type, and it is beneficial for the user to quickly identify and issue insurance operations in the way of indicating identifying instead of directly displaying the insurance data, without causing unnecessary interference to safe driving.

In some embodiments, for example, when the mobile device 120 determines that the weather warning type is dense fog based on the meteorological data and/or environmental data acquired after the user opens a door of the vehicle 110 by shaking the mobile device 120, a key card displayed on the mobile device 120 displays warning or identifier, for example, "today is foggy, drive carefully", and whether "to purchase 10 yuan extra insurance or scratching insurance". If the user clicks purchase, for example, "big icon with insurance today" is displayed on the screen of the vehicle 110.

In some embodiments, if the mobile device 120 or the on-board computer of the vehicle 110 confirms that the weather warning type indicates heavy rain, whether a wading warning region exists in a route from a current location to the destination may further be determined. The wading warning region may be determined based on on at least one of a geographic feature, a road attribute and historical data associated with the route. If the mobile device 120 the on-board computer of the vehicle 110 determines that the wading warning region exists in the route, information for identifying a to-be-selected route between the current location and the destination is displayed on at least one of the mobile device and the on-board display screen of the vehicle.

In some embodiments, the mobile device 120 or the on-board computer of the vehicle 110 may plan a better route without involving the wading warning region for the user. If an operation on the planned route (for example, the user clicks on the planned route without the wading warning region) is detected by the mobile device 120 or the on-board computer of the vehicle 110, the mobile device 120 or the on-board computer of the vehicle 110 may determine an expected time to arrive at the destination via the planned route based on navigation information and traffic information (such as traffic accident congestion information provided by an IoV platform) received by the mobile device 120. Then, the expected time is displayed on at least one of the mobile device and the on-board display screen of the vehicle.

Figure 3:
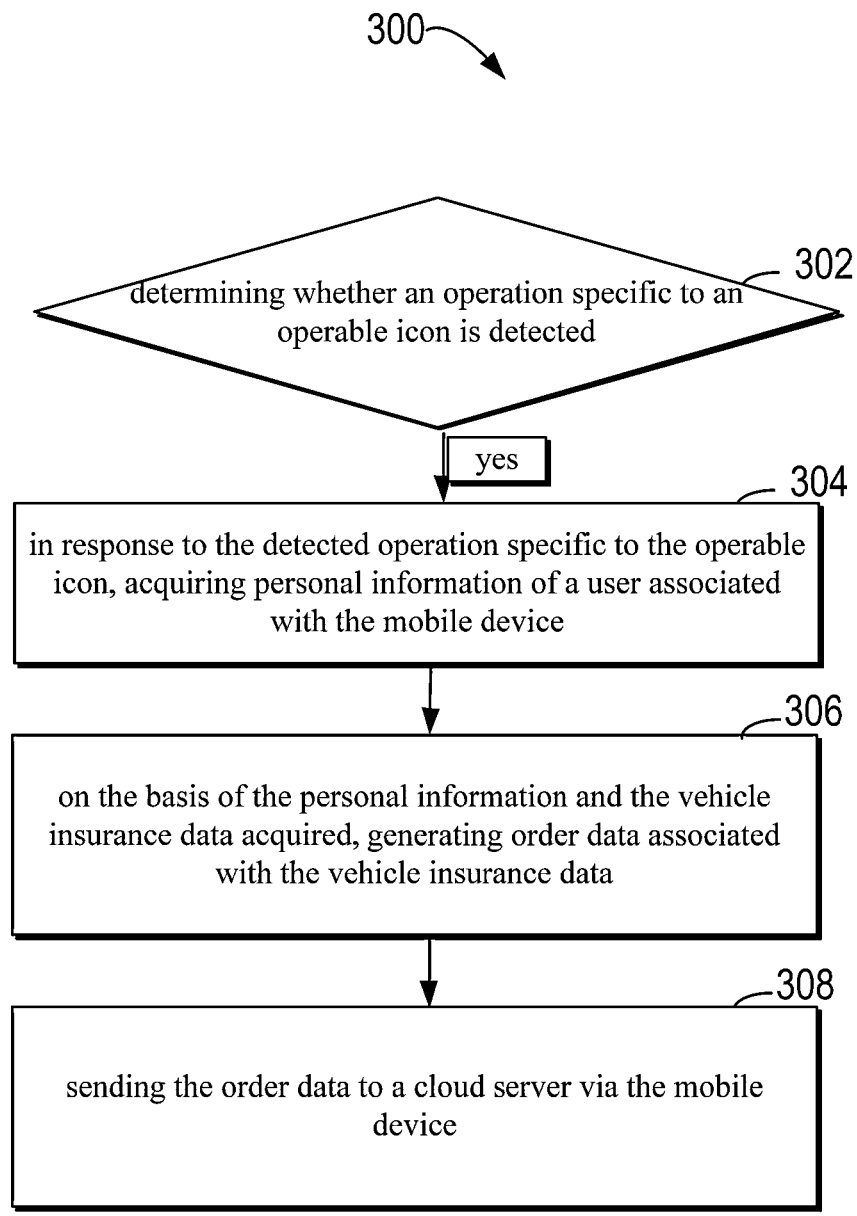
FIG. 3 illustrates a flow chart of a method 300 for generating an insurance order according to an embodiment of the present disclosure.

In some embodiments, the method 200 may also include a method 300 for generating an insurance order. The method for generating the insurance order will be described hereinafter with reference to FIG. 3. FIG. 3 illustrates a flow chart of the method 300 for generating the insurance order according to the embodiment of the present disclosure. It should be understood that the method 300, for example, may be performed at an electronic device 1000 described in FIG. 10. The method may also be executed at the mobile device 120 described in FIG. 1 or at the on-board computer of the vehicle 110. It should be understood that the method 300 may further include additional actions which are not shown and/or the illustrated actions may be omitted, and the scope of the present disclosure is not limited in this respect.

At box 302, the mobile device 120 or the on-board computer of the vehicle 110 determines whether an operation specific to the operable icon is detected.

At box 304, if the operation specific to the operable icon is detected by the mobile device 120 or the on-board computer of the vehicle 110, personal information of a user associated with the mobile device may be acquired. The personal information is, for example, personal data and payment information needed for purchasing insurance.

At box 306, the mobile device 120 or the on-board computer of the vehicle 110, based on the personal information and the vehicle insurance data acquired, generates order data associated with the vehicle insurance data.

At box 308, the order data is sent to a cloud server via the mobile device.

In some embodiments, the mobile device 120 or the on-board computer of the vehicle 110 may determine whether the operation specific to the operable icon is detected; if the operation specific to the operable icon is detected, the order data associated with the vehicle insurance data may be directly sent to the cloud server via the mobile device 120. In this way, the insurance order may be sent directly by the operation of the user on the operation icon, for example, in some cases such as less premium and the personal information of the user being already stored in the server, the insurance may be purchased conveniently and efficiently.

Figure 4:
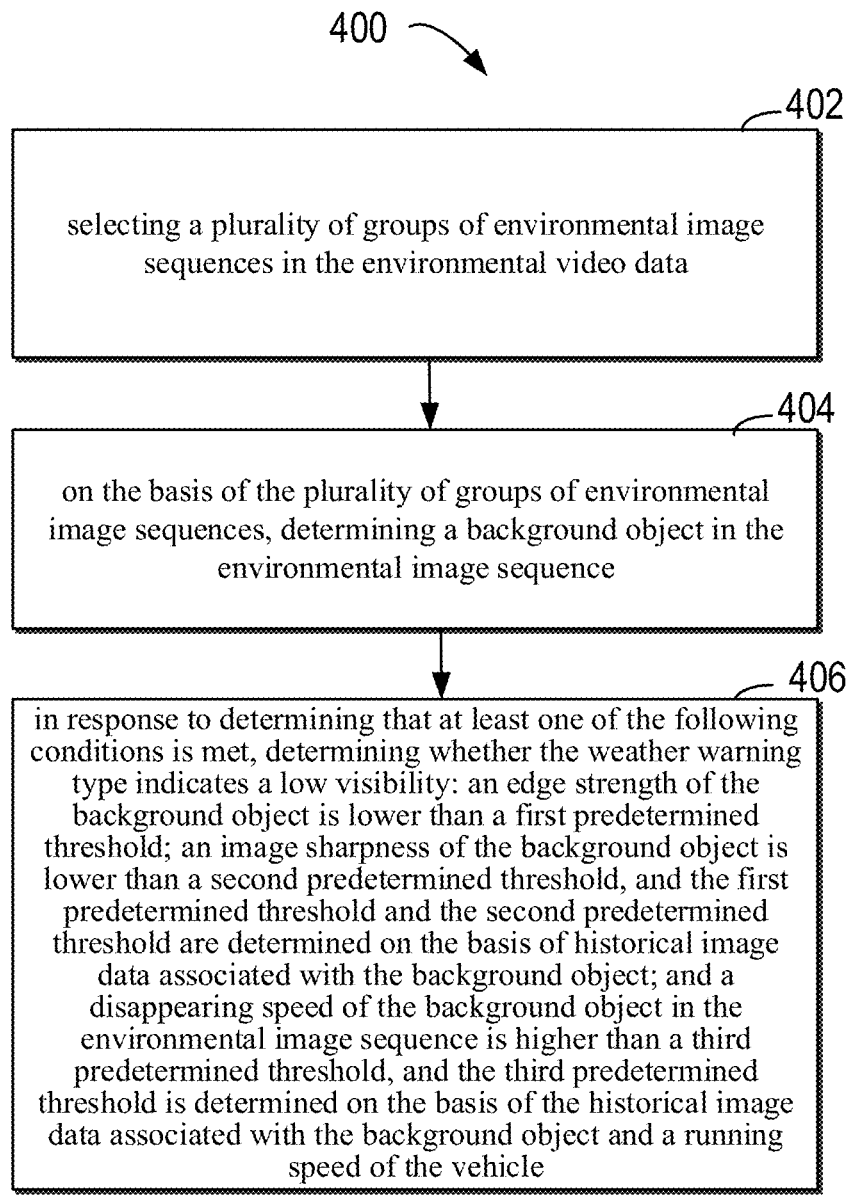
FIG. 4 illustrates a flow chart of a method 400 for determining a weather warning type according to an embodiment of the present disclosure.

FIG. 4 illustrates a flow chart of a method 400 for determining a weather warning type according to an embodiment of the present disclosure. It should be understood that the method 400, for example, may be performed at an electronic device 1000 described in FIG. 10. The method may also be executed at the mobile device 120 described in FIG. 1 or at the on-board computer of the vehicle 110. It should be understood that the method 400 may further include additional actions which are not shown and/or the illustrated actions may be omitted, and the scope of the present disclosure is not limited in this respect.

At box 402, the mobile device 120 or the on-board computer of the vehicle 110 selects a plurality of groups of environmental image sequences in the environmental video data.

At box 404, the mobile device 120 or the on-board computer of the vehicle 110, based on the plurality of groups of environmental image sequences, determines a background object in the environmental image sequence.

At box 406, if the mobile device 120 or the on-board telematics of the vehicle 110 determines at least one of the following conditions is met, determining whether the weather warning type indicates a low visibility: an edge strength of the background object is lower than a first predetermined threshold; an image sharpness of the background object is lower than a second predetermined threshold, and the first predetermined threshold and the second predetermined threshold are determined based on historical image data associated with the background object; and a disappearing speed of the background object in the environmental image sequence is higher than a third predetermined threshold, and the third predetermined threshold is determined based on the historical image data associated with the background object and a driving speed of the vehicle. By adopting the above means, the present disclosure is capable of quickly and accurately determining the weather warning type, especially the low visibility, so as to indicate the insurance matching with the low visibility in time.

Figure 5:
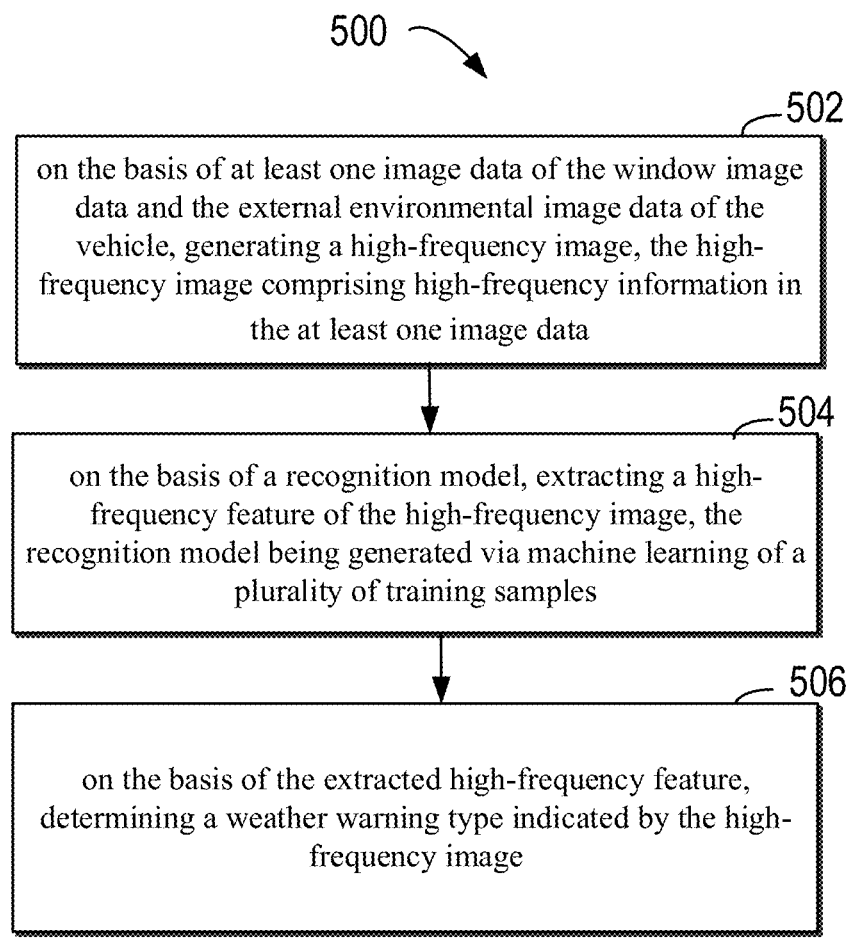
FIG. 5 illustrates a flow chart of a method 500 for determining a weather warning type according to an embodiment of the present disclosure.

FIG. 5 illustrates a flow chart of a method 500 for determining a weather warning type according to an embodiment of the present disclosure. It should be understood that the method 500, for example, may be performed at an electronic device 1000 described in FIG. 10. The method may also be executed at the mobile device 120 described in FIG. 1 or at the on-board computer of the vehicle 110. It should be understood that the method 500 may further include additional actions which are not shown and/or the illustrated actions may be omitted, and the scope of the present disclosure is not limited in this respect.

At box 502, the mobile device 120 or the on-board computer of the vehicle 110, based on at least one image data of the window image data and the external environmental image data of the vehicle, generates a high-frequency image, the high-frequency image including high-frequency information in the window image data and/or external environmental image data of the vehicle. In some embodiments, the mobile device 120 or the on-board computer of the vehicle 110 may generate window high-frequency images based on the window image data via frequency domain transformation. For example, high-frequency images correspond to high-frequency components of the window image data, and low-frequency images correspond to low-frequency components of the window image data.

It should be understood that the low-frequency component (low-frequency signal) in the image generally represents a part with small gradient change in the image, for example, a region with slow change in brightness or gray value, so the low-frequency component may be used to comprehensively measure an intensity of the whole image. The high-frequency component (high-frequency signal) in the image generally indicates a part with sharp changes or large gradient changes, such as an edge (contour) or noise and details of the image. Therefore, the high-frequency component may be used to measure the edge and the contour of the image. As mentioned above, the image noise data in a traditional sense is usually distributed in the high-frequency part of the image. It is found through research that the influences of the severe weather on the images are usually distributed in the high-frequency part.

In some embodiments, the mobile device 120 or the on-board computer of the vehicle 110 may divide the window image data or the external environmental image data of the vehicle into high-frequency images (high-frequency images) and low-frequency images (low-frequency images) based on wavelet transform. By using wavelet transform to obtain the high-frequency images for identifying the influences of the severe weather in the window image data, good local characters in both a time domain and a frequency domain can be realized, so the high-frequency information can be extracted from the signal more effectively. Especially, the needs of analyzing the non-stationary signal that represents the influence of the severe weather can be better met.

In some embodiments, the mobile device 120 or the on-board computer of the vehicle 110 may also perform two-dimensional Fourier transform on the window image data, so as to generate a spectrum diagram of the window image data. In this spectrum diagram, the distribution of the image gradient of the window image data is identified. A plurality of high-frequency components indicating severe weather may exist on a frequency spectrum of the window image data. Different types of severe weather will also cause different features of the high-frequency components with drastic changes in the window image data. If the intensity of each location of the window image data changes little, the window image data only has low frequency components. Then, it may be possibly indicated that no severe weather exists.

At box 504, the mobile device 120 or the on-board computer of the vehicle 110 may, based on a recognition model, extracts a high-frequency feature of the high-frequency image. The recognition model may be generated via machine learning of a plurality of training samples. The feature of the high-frequency image may be extracted through a plurality of ways. The following describes how to extract the feature of the high-frequency image with reference to FIGS. 6 to 8.

Figure 6:
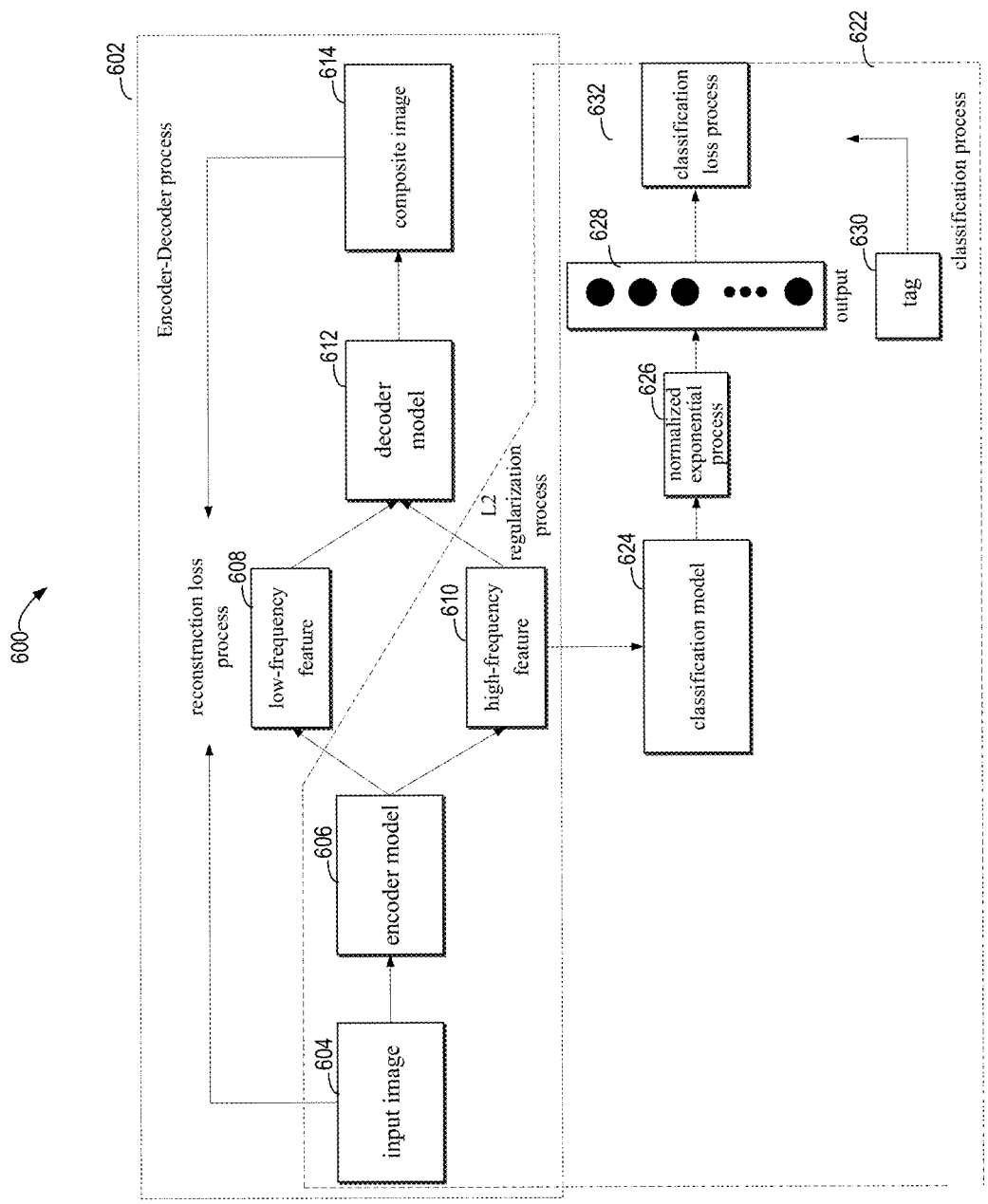
FIG. 6 illustrates an overall schematic diagram of a method 600 for identifying a weather warning type according to an embodiment of the present disclosure.

FIG. 6 illustrates an overall schematic diagram of a method 600 for identifying a weather warning type according to an embodiment of the present disclosure. As shown in FIG. 6, the high-frequency feature of the high-frequency image (such as window noise image) may be extracted by using an encoder-decoder neural network model. Then, the high-frequency features extracted are classified by the encoder-decoder neural network model through the classification model to determine the weather warning type, that is, predicting a type value indicating the warning weather.

As shown in FIG. 6, the recognition method 600 for determining the weather warning type mainly includes an encoder-decoder process 602 and a classification process 604. The encoder-decoder process 602 is mainly used to implement actions at box 504. In some embodiments, the encoder-decoder process 602 is used to extract the high-frequency feature based on the input high-frequency image (e.g., window high-frequency image and/or vehicle external environment high-frequency image). The classification process 604 is configured for, based on the extracted high frequency feature, determining the weather warning type.

In some embodiments, the encoder-decoder process 602 includes: inputting an input image 604 (e.g., a window high-frequency image and/or an external environment high-frequency image of the vehicle) into an encoder model 606 to generate a low-frequency feature 608 and a high-frequency feature 610, and then inputting the low-frequency feature 608 and the high-frequency feature 610 subjected to L2 regularization process into a decoder model 612 for processing to generate a composite image 614. The generated composite image 614 can be used as a training sample of the encoder-decoder process 602. A network structure parameter of an encoder-decoder neural network model is adjusted in the process of training a large number of samples through reconstruction loss processing. It should be understood that the high-frequency feature of the high-frequency image can be extracted through the encoder-decoder process 602.

Figure 7:
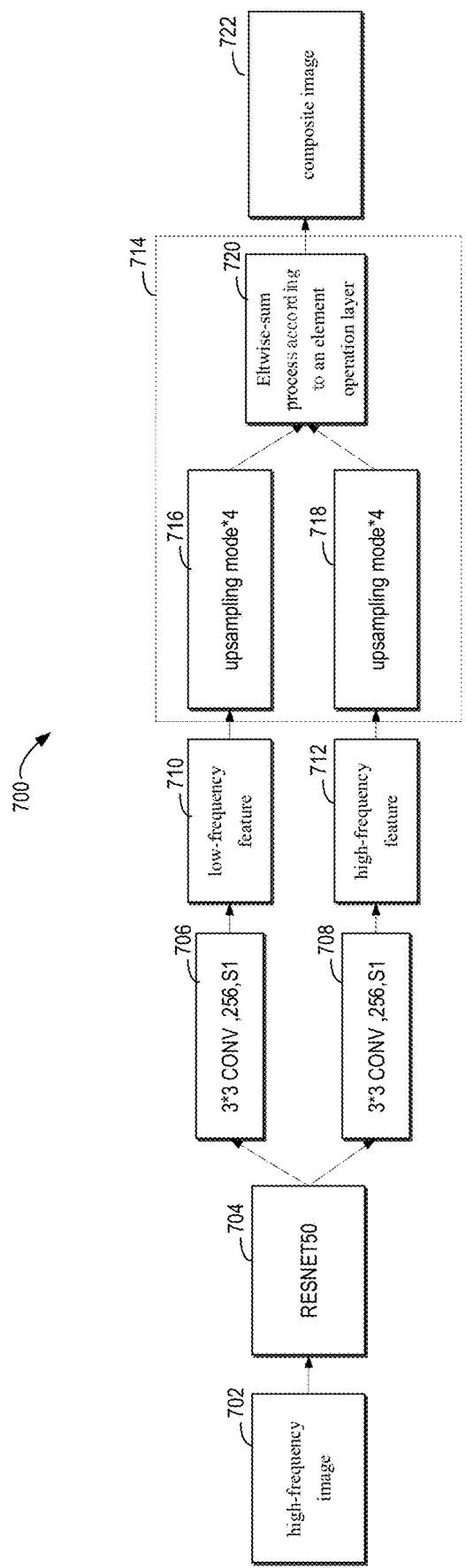
FIG. 7 illustrates a schematic diagram of a process method 700 for extracting a high-frequency feature according to an embodiment of the present disclosure.

FIG. 7 illustrates a schematic diagram of a process 700 for extracting a high-frequency feature according to an embodiment of the present disclosure. As shown in FIG. 7, the plurality of high-frequency images 702 mentioned above (e.g., window high-frequency images) are taken as input images, and are input to a resNet50 model 704 (a convolution layer of the ResNet50 model is 50). After convolution processes 706 and 708, a low-frequency feature 710 and a high-frequency feature 712 are obtained respectively, and then a composite image 722 is output via an Eltwise-sum process 720 according to an element operation layer. The upsampling models 716 and 718 and the Eltwise-sum process 720 constitute a decoder network structure 714.

The ResNet50 includes three main parts: an input part, an output part and an intermediate convolution part. The intermediate convolution part is configured for extracting the high-frequency feature of the input high-frequency image through convolution stacking, which includes four stages from Stage1 to Stage4, for example. The ResNet50 changes a step size (Stride=2) in the stage4 to 1, so a feature image obtained through the ResNet50 is 1/16th of the input image, which is beneficial to improving the processing effect and efficiency and greatly reducing the space required for storage. Using the ResNet50 model to perform encoder process is beneficial to improve the processing effect and efficiency of decomposing the low-frequency feature 710 and the high-frequency feature 612.

In some embodiments, a number of convolution kernels of the convolution processes 706 and 708 is, for example, 256, a size of the convolution kernels is, for example, 3*3, and a step length (stride) is, for example, 1.

In some embodiments, the upsampling model 716 or 718, for example, refers to four groups of sampling models. The decoder network structure 714 is configured for restoring the processed image to the original input image, so it is necessary to restore the image after the previous dimension reduction process to an image with the same size as the original input image through the upsampling model. This can make the Reconstruction loss process of the image relatively easy.

The reconstruction loss process is specifically explained hereinafter with reference to the formula (2).

$$\ell_r = \|I - I'\|_2^2. \tag{2}$$

In the above formula (2), I represents a two-dimensional vector of the input image (for example, the high-frequency image 702). I' represent a two-dimensional vector of the composite image 722 processed via the decoder network structure 714. $\ell_r$ represents the reconstruction loss. Generally, the smaller the reconstruction loss is, the better the encoder-decoder model fits. In some embodiments, a reconstruction loss function is a square sum of pixel points corresponding to the two-dimensional vector of the input image and the two-dimensional vector of the composite image.

The high-frequency loss processing of the output of the high-frequency feature 610 will be explained in detail with the formula (3) below.

$$\ell_e = \|I_H\|_2^2. \tag{3}$$

In the above formula (3), IH represents a two-dimensional vector of the high-frequency feature. $\ell_e$ represents high-frequency loss.

Figure 8:
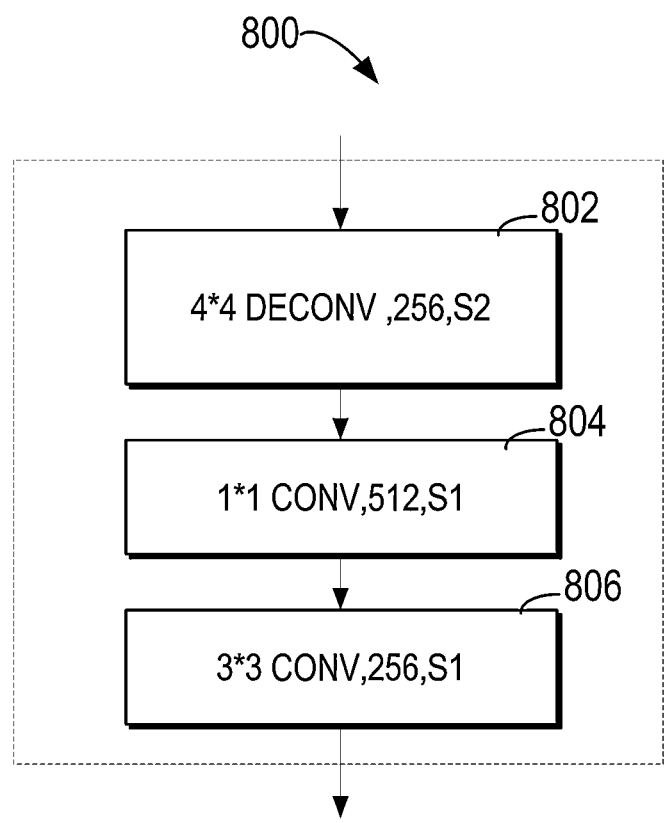
FIG. 8 illustrates a schematic diagram of a method 800 of an upsampling process according to an embodiment of the present disclosure.

FIG. 8 illustrates a schematic diagram of an upsampling process 800 according to an embodiment of the present disclosure. As shown in FIG. 8, the upsampling process 800 exemplifies, for example, one group of sampling models in the four groups of sampling models in the aforementioned upsampling model 716 or 718. The upsampling process 800 includes, for example, a deconvolution process 802, a convolution process 804, and a convolution process 806. In the deconvolution process 802, there are 256 convolution kernels, a size of the convolution kernel is 4*4, and a step length (stride) is, for example, 2. In the deconvolution process 804, there are 512 convolution kernels, a size of the convolution kernel is 1*1, and a step length (stride) is, for example, 1. In the deconvolution process 806, there are 256 convolution kernels, a size of the convolution kernel is 3*3, and a step length (stride) is, for example, 1.

An overall loss function of the encoder-decoder process may be, for example, calculated by the following formula (4).

$$\mathcal{L}_t = \ell_r + \lambda \ell_e \tag{4}$$

In the above formula (4), $\ell_r$ represents the reconstruction loss, $\ell_e$ represents the high-frequency loss, $\mathcal{L}_t$ represents the overall loss of the encoder-decoder process, and $\lambda$ represents coefficient, which is used to balance the importance of the reconstruction loss and the high-frequency loss in the overall loss of the encoder-decoder process.

At box 506, the mobile device 120 or the on-board computer of the vehicle 110, based on the extracted high-frequency feature, determines a weather warning type indicated by the high-frequency image. The weather warning type indicated by the window high-frequency image may be determined through a plurality of ways. How to determine the warning weather type indicated by the high-frequency image will be described in detail below with reference to the classification process 604 in FIG. 6. As shown in FIG. 6, the classification process 604, for example, includes: inputting the high-frequency features 610 extracted by the encoder-decoder process 602 into the classification model 624, then performing a normalized exponential process 626 (Softmax) to obtain an output 628, and adjusting a network structure parameter of the classification model 622 via a classification loss process 632. It should be understood that through the processing of the classification model 622, the determined warning weather type for the high-frequency feature 610 is, for example, a type indicated by a tag 630.

In some embodiments, the categorization model 624 may use a ResNet18 classification network to determine the weather warning type based on the extracted high-frequency feature. The ResNet18 classification network may, for example, reduce a dimension of an input high-frequency feature map through downsampling processing of each stage based on the input high-frequency feature 610 until the input high-frequency feature map is finally output by a fully connected layer. For example, a number of output nodes of the classification model 624 is consistent with a number of predicted weather warning types.

The loss function of the classification process at box 506, for example, follows the following formula (5).

$$\mathcal{L}_1 = -\frac{1}{N}\sum_{i=1}^{N}\sum_{c=0}^{C-1}1(y_i = c)\log p_c \tag{5}$$

In the above formula (5), N represents a number of samples, C represents a category, $y_i$ represents an output predicted value about the weather warning type, $p_c$ represents an output value of the normalized exponential process 626, and $\mathcal{L}_1$ represents the loss function of the classification process.

In the foregoing solution, the high-frequency image indicating the influence of the severe weather is generated according to the distribution difference of the severe weather such as rainy days, foggy days and snowy days in high frequencies, and the high-frequency images are classified by using the classification network, so that the weather warning type can be determined efficiently and accurately.

Figure 9:
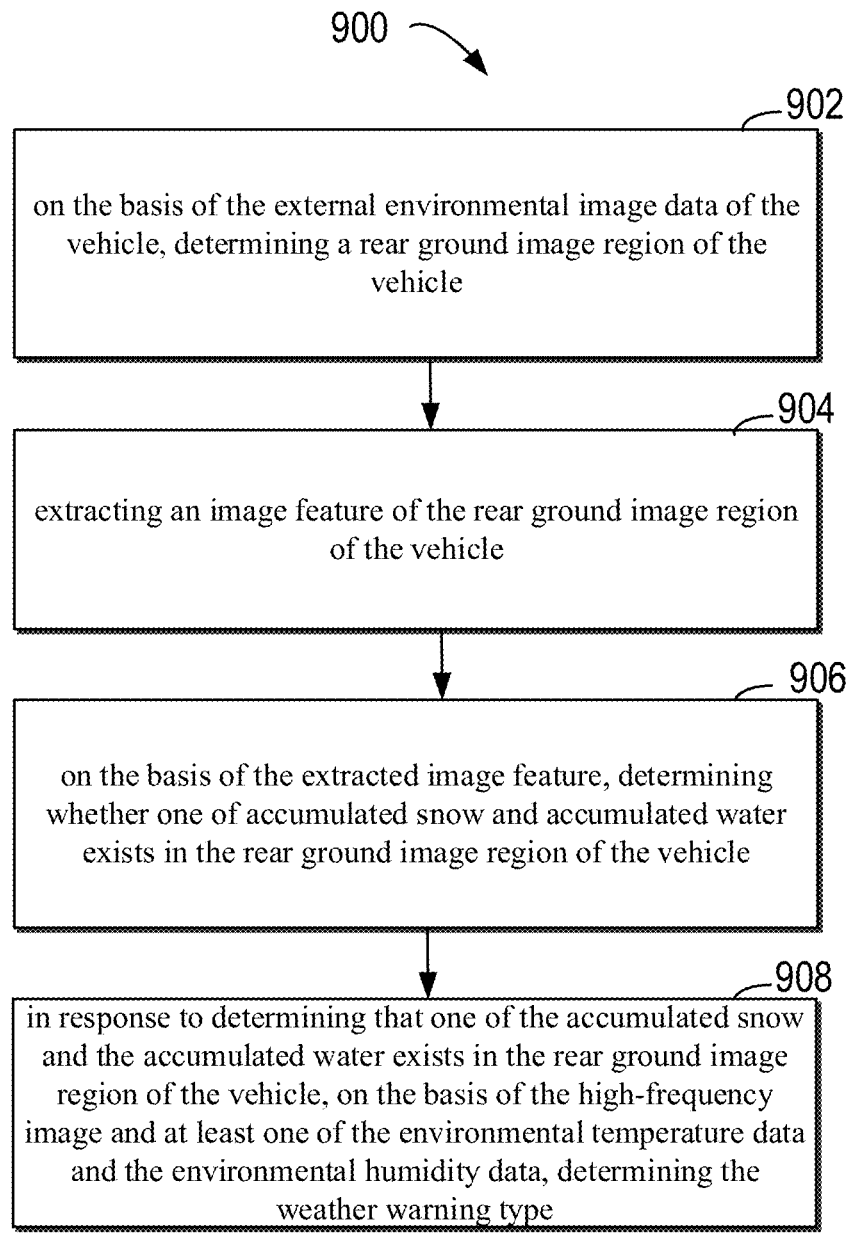
FIG. 9 illustrates a schematic diagram of a method 900 for determining a weather warning type according to an embodiment of the present disclosure.

In some embodiments, not only the window high-frequency image may be used to determine the weather warning type, but also the detection results of various sensors may be integrated to comprehensively determine the weather warning type, so that the determination results are more accurate. How to integrate the detection results of various sensors to determine the weather warning type will be illustrated hereinafter with reference to FIG. 9. FIG. 9 illustrates a schematic diagram of a method 900 for determining a weather warning type according to an embodiment of the present disclosure. It should be understood that the method 900, for example, may be performed at an electronic device 1000 described in FIG. 10. The method may also be executed at the mobile device 120 described in FIG. 1 or at the on-board computer of the vehicle 110. It should be understood that the method 900 may further include additional actions which are not shown and/or the illustrated actions may be omitted, and the scope of the present disclosure is not limited in this respect.

At box 902, the mobile device 120 or the on-board computer of the vehicle 110, based on the external environmental image data of the vehicle, determines a rear ground image region of the vehicle.

At box 904, the mobile device 120 or the on-board computer of the vehicle 110 extracts an image feature of the rear ground image region of the vehicle.

At box 906, the mobile device 120 or the on-board computer of the vehicle 110, based on the extracted image feature, determines whether one of accumulated snow and accumulated water exists in the rear ground image region of the vehicle.

At box 908, if the mobile device 120 or the on-board computer of the vehicle 110 determines that one of the accumulated snow and the accumulated water exists in the rear ground image region of the vehicle, the weather warning type may be determined based on the high-frequency image and at least one of the environmental temperature data and the environmental humidity data.

In the foregoing solution, the weather warning type, such as heavy precipitation weather and snowstorm weather, can be accurately identified by integrating the recognition results based on the window high-frequency image, the recognition results based on the rear ground image region of the vehicle, the environmental temperature data and the environmental humidity data.

Figure 10:
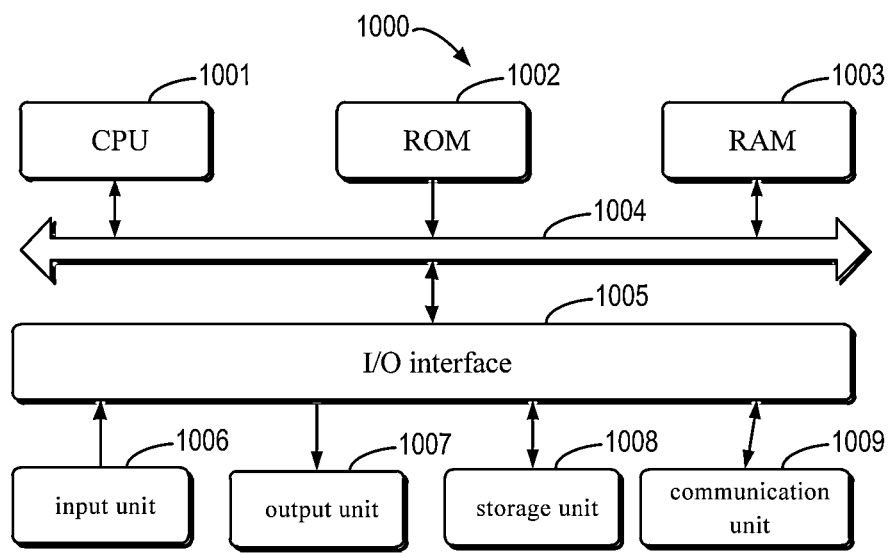
FIG. 10 schematically illustrates a block diagram of an electronic device 1000 suitable for implementing the embodiments of the present disclosure.

FIG. 10 schematically illustrates a block diagram of an electronic device 1000 suitable for implementing the embodiments of the present disclosure. The device 1000 may be a device for implementing the methods 200, 300, 400, 500 and 900 shown in FIGS. 2 to 5. As shown in FIG. 10, the device 1000 includes a central processing unit (CPU) 1001, which can perform various appropriate actions and processes according to a computer program instruction stored in a read-only memory (ROM) 1002 or loaded from a storage unit 1008 into a random access memory (RAM) 1003. In the RAM 1003, various programs and data needed for operating the device 1000 may also be stored. The CPU 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, an output unit 1007, and a storage unit 1008. The processing unit 1001 executes various methods and processes described above, such as executing the methods 200, 300, 400, 500, and 900. For example, in some embodiments, the methods 200, 300, 400, 500 and 9000 may be implemented as a computer software program, which is tangibly embodied in a machine-readable medium, such as the storage unit 1008. In some embodiments, a part or all of the computer program may be loaded and/or installed on the device 1000 via the ROM 1002 and/or the communication unit 1009. When the computer program is loaded into the RAM 1003 and executed by the CPU 1001, one or more operations of the methods 200, 300, 400, 500, and 900 described above may be executed. Alternatively, in other embodiments, the computing unit 1001 may be configured to execute one or more operations of the methods 200, 300, 400, 500, and 900 by any other suitable means (for example, by means of firmware).

It should be further illustrated that the present disclosure may be a method, an apparatus, a system and/or a computer program product. The computer program product may include a computer-readable storage medium carrying a computer-readable program instruction for performing various aspects of the present disclosure.

The computer-readable storage medium may be a tangible device that can hold and store an instruction used by an instruction executing device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (ROM) (EPROM or flash memory), a static random access memory (SRAM), a portable compact disc read-only memory (CD-ROM), a digital versatile disc (DVD), a memory stick, a floppy disc, a mechanical coding device, such as a punch card or a bulge structure in a groove on which an instruction is stored, or any suitable combination of the above. The computer-readable storage medium used here is not interpreted as instantaneous signals, such as radio waves or other freely propagated electromagnetic waves, electromagnetic waves propagated through waveguides or other transmission media (for example, light pulses through fiber optic cables), or electrical signals transmitted through electric wires.

The computer-readable storage medium used here may be downloaded from a computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives a computer-readable program instruction from the network and forwards the computer-readable program instruction for storage in the computer-readable storage medium in each computing/processing device.

The computer program instruction for performing operations of the present disclosure may be an assembly instruction, an Instruction Set Architecture (ISA) instruction, a machine instruction, a machine-related instruction, a microcode, a firmware instruction, status setting data, or a source code or an object code written in one programming language or any combination of more programming languages. The programming languages include object-oriented programming languages such as Smalltalk, C++, and conventional procedural programming languages such as "C or similar programming languages. The computer-readable program instructions may be executed entirely on a user computer, partially executed on the user computer, executed as an independent software package, partially executed on the user computer and partially executed on a remote computer, or entirely executed on the remote computer or a server. In the case of involving in the remote computer, the remote computer can be connected to the user computer via any kind of network, including a local area network (LAN) or a wide area network (WAN), or can be connected to an external computer (e.g., connected via the Internet using an Internet service provider). In some embodiments, electronic circuits, such as a programmable logic circuit, a field programmable gate array (FPGA), or a programmable logic array (PLA), can be customized by utilizing the status information of the computer-readable program instruction. The electronic circuits can execute the computer-readable program instruction, thereby implementing various aspects of the present disclosure.

Various aspects of the present disclosure have been described with reference to the flow charts and/or block diagrams of the method, device (system), and computer program products according to the embodiments of the present disclosure. It should be understood that each block of the flow chart and/or block diagram and combinations of the blocks in the flow chart and/or block diagram can be implemented by computer-readable program instructions.

These computer-readable program instructions may be provided to a processor in a voice interaction apparatus, a general purpose computer, a special purpose computer, or a processing unit of other programmable data processing device to produce a machine for the instructions executed by the computer or the processing unit of other programmable data processing device to generate an apparatus for implementing the functions specified in one or more flows of the flow chart and/or in one or more blocks of the block diagram. These computer-readable program instructions may also be stored in a computer-readable memory that can guide the computer, the programmable data processing device and/or other device to work in a given manner, so that the computer-readable medium stored with instructions includes a product including an instruction that implements various aspects of the functions/actions specified in one or more blocks of the flow chart and/or block diagram.

These computer-readable program instructions may also be loaded to a computer, other programmable data processing device, or other apparatus, so that a series of operating steps are executed on the computer, the other programmable data, or the other apparatus to produce processing implemented by the computer, so that the instructions executed in the other programmable data, or the other apparatus implement the functions/actions specified in one or more blocks of the flow chart and/or block diagram.

The flow charts and block diagrams in the drawings show the possibly implemented architectures, functions, and operations of the device, the method and the computer program product according to multiple embodiments of the present disclosure. In this regard, each block in the flow chart or block diagram may represent one module, one program segment, or a part of an instruction. The module, the program segment, or the part of an instruction contains one or more executable instructions for implementing specified logical functions. In some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flow charts, and combinations of the blocks in the block diagrams and/or flow charts, may be implemented with dedicated hardware-based systems that perform specified functions or actions, or may be implemented with combinations of dedicated hardware and computer instructions.

Various embodiments of the present disclosure have been described above, and the above description is exemplary, not exhaustive, and is not limited to the disclosed embodiments. Many modifications and variations will be apparent to those of ordinary skills in the art without departing from the scope and spirit of the illustrated embodiments. Terms used herein are selected to best explain the principles and practical applications of various embodiments or technical improvements to technologies in the market, or to enable other people of ordinary skills in the art to understand various embodiments disclosed herein.

The above descriptions are only optional embodiments of the present disclosure, and are not used to limit the present disclosure. Many modifications and variations will be apparent to those of ordinary skills in the art. Any change, equivalent substitution, and improvement made within the spirit and principle of the present disclosure shall fall within the protection scope of the present disclosure.

The invention claimed is:

1. A management method for vehicle safety, wherein the method comprises:
   acquiring at least one of meteorological data and environmental data, wherein the environmental data is collected by an on-board device on a vehicle;
   determining a weather warning type, based on at least one of the meteorological data and the environmental data;
   in response to determining that the weather warning type meets a predetermined warning condition, determining vehicle insurance data matched with the vehicle, based on at least one of the meteorological data and the environmental data as well as driving data of the vehicle; and
   displaying an identifier associated with the vehicle insurance data on at least one of a mobile device and an on-board display screen of the vehicle, wherein the mobile device is associated with the vehicle when a predetermined operation is detected on the mobile device;
   wherein the environmental data at least comprises one of the following items:
      environmental video data collected by a camera device of the vehicle, wherein the environmental video data at least comprises window image data of the vehicle and external environmental image data of the vehicle;
      environmental humidity data detected via a humidity sensor of the vehicle;
      environmental air volume data detected via an air volume sensor of the vehicle;
      rainfall data detected via a wiper sensor of the vehicle; and
      environmental temperature data detected via a temperature sensor of the vehicle;
   wherein the step of determining the weather warning type comprises:
      selecting a plurality of groups of environmental image sequences in the environmental video data;
      determining a background object in the environmental image sequence, based on the plurality of groups of environmental image sequences; and
      in response to determining that at least one of the following conditions is met, determining whether the weather warning type indicates a low visibility:
         an edge strength of the background object is lower than a first predetermined threshold;
         an image sharpness of the background object is lower than a second predetermined threshold, and the first predetermined threshold and the second predetermined threshold are determined based on historical image data associated with the background object; and
         a disappearing speed of the background object in the environmental image sequence is greater than a third predetermined threshold, and the third predetermined threshold is determined based on the historical image data associated with the background object and a driving speed of the vehicle.

2. The method according to claim 1, wherein the method further comprises:
   acquiring environmental video data of the vehicle via a streaming rearview mirror of the vehicle, wherein the environmental video data at least comprises window image data of the vehicle and external environmental image data of the vehicle, and the streaming rearview mirror is connected to a plurality of camera devices of the vehicle.

3. The method according to claim 1, wherein the identifier associated with the vehicle insurance data comprises an operable icon for indicating a vehicle insurance type matched with the vehicle.

4. The method according to claim 3, wherein the method further comprising:
   in response to that an operation at the operable icon is detected, acquiring personal information of a user associated with the mobile device;
   generating order data associated with the vehicle insurance data, based on the personal information and the vehicle insurance data; and
   sending the order data to a cloud server via the mobile device.

5. The method according to claim 3, wherein the method further comprises:
   in response to that an operation at the operable icon is detected, sending order data associated with the vehicle insurance data to a cloud server via the mobile device.

6. The method according to claim 1, wherein the method further comprises:
   at the mobile device, in response to determining that a distance of the mobile device relative to the vehicle is less than a predetermined value, acquiring the environmental data and the meteorological data for determining the weather warning type.

7. The method according to claim 1, wherein the step of determining the weather warning type comprises:
   generating environmental image noise data, based on environmental image data of the vehicle; and
   determining whether the weather warning type indicates one of a heavy rain, a heavy snow and a hailstone, based on a probability distribution of the environmental image noise data.

8. The method according to claim 1, wherein the step of determining the weather warning type further comprises:
   generating a high-frequency image, based on at least one image data of the window image data and the external environmental image data of the vehicle, the high-frequency image comprises high-frequency information in the at least one image data;
   extracting a high-frequency feature of the high-frequency image, based on a recognition model, the recognition model is generated via machine learning of a plurality of training samples; and
   determining a weather warning type indicated by the high-frequency image, based on the extracted high-frequency feature.

9. The method according to claim 7, wherein the step of determining the weather warning type further comprises:
  determining a rear ground image region of the vehicle, based on the external environmental image data of the vehicle;
  extracting an image feature of the rear ground image region of the vehicle;
  determining whether one of accumulated snow and accumulated water exists in the rear ground image region of the vehicle, based on the extracted image feature; and
  in response to determining that one of the accumulated snow and the accumulated water exists in the rear ground image region of the vehicle, determining the weather warning type, based on the high-frequency image and at least one of the environmental temperature data and the environmental humidity data.

10. The method according to claim 1, further comprising:
  in response to confirming that the weather warning type indicates a heavy rain, determining whether a wading warning region exists in a route from a current location to a destination, wherein the wading warning region is determined based on at least one of a geographic feature, a road attribute and historical data associated with the route; and
  in response to determining that the wading warning region exists in the route, displaying information for identifying a to-be-selected route between the current location and the destination on at least one of the mobile device and the on-board display screen of the vehicle.

11. The method according to claim 10, further comprising:
  in response to that an operation regarding to the to-be-selected route is detected, determining an expected time to arrive at the destination via the to-be-selected route, based on navigation information and traffic information received by the mobile device; and
  presenting the expected time on at least one of the mobile device and the on-board display screen of the vehicle.

12. The method according to claim 1, wherein the step of determining that the weather warning type meets the predetermined warning condition comprises at least one of the following items:
  in response to determining that the weather warning type indicates at least one of low visibility, heavy snow, heavy rain, lightning, hailstone and freezing, determining that the weather warning type meets the predetermined warning condition, the low visibility comprises at least one of haze and sandstorm; and
  in response to determining that a current weather warning type relative to a change of the weather warning type in the past predetermined time interval meets a first predetermined condition, determining that the weather warning type meets the predetermined warning condition.

13. A management apparatus for vehicle safety, comprising:
  a memory configured for storing one or more computer programs; and
  a processor coupled to the memory and configured for executing the one or more programs to cause the apparatus to execute a management method for vehicle safety, wherein the method comprises:
    acquiring at least one of meteorological data and environmental data, wherein the environmental data is collected by an on-board device on a vehicle;
    determining a weather warning type, based on at least one of the meteorological data and the environmental data;
    in response to determining that the weather warning type meets a predetermined warning condition, determining vehicle insurance data matched with the vehicle, based on at least one of the meteorological data and the environmental data as well as driving data of the vehicle; and
    displaying an identifier associated with the vehicle insurance data on at least one of a mobile device and an on-board display screen of the vehicle, wherein the mobile device is associated with the vehicle when a predetermined operation is detected on the mobile device;
  wherein the environmental data at least comprises one of the following items:
    environmental video data collected by a camera device of the vehicle, wherein the environmental video data at least comprises window image data of the vehicle and external environmental image data of the vehicle;
    environmental humidity data detected via a humidity sensor of the vehicle;
    environmental air volume data detected via an air volume sensor of the vehicle;
    rainfall data detected via a wiper sensor of the vehicle; and
    environmental temperature data detected via a temperature sensor of the vehicle;
  wherein the step of determining the weather warning type comprises:
    selecting a plurality of groups of environmental image sequences in the environmental video data;
    determining a background object in the environmental image sequence, based on the plurality of groups of environmental image sequences; and
    in response to determining that at least one of the following conditions is met, determining whether the weather warning type indicates a low visibility:
      an edge strength of the background object is lower than a first predetermined threshold;
      an image sharpness of the background object is lower than a second predetermined threshold, and the first predetermined threshold and the second predetermined threshold are determined based on historical image data associated with the background object; and
      a disappearing speed of the background object in the environmental image sequence is greater than a third predetermined threshold, and the third predetermined threshold is determined based on the historical image data associated with the background object and a driving speed of the vehicle.

14. A non-transitory computer-readable storage medium storing a machine-executable instruction thereon, wherein the machine-executable instruction, when executed, causes a machine to execute the steps of a management method for vehicle safety, wherein the method comprises:
  acquiring at least one of meteorological data and environmental data, wherein the environmental data is collected by an on-board device on a vehicle;
  determining a weather warning type, based on at least one of the meteorological data and the environmental data;
  in response to determining that the weather warning type meets a predetermined warning condition, determining vehicle insurance data matched with the vehicle, based on at least one of the meteorological data and the environmental data as well as driving data of the vehicle; and displaying an identifier associated with the vehicle insurance data on at least one of a mobile device and an on-board display screen of the vehicle, wherein the mobile device is associated with the vehicle when a predetermined operation is detected on the mobile device;

wherein the environmental data at least comprises one of the following items:

environmental video data collected by a camera device of the vehicle, wherein the environmental video data at least comprises window image data of the vehicle and external environmental image data of the vehicle;

environmental humidity data detected via a humidity sensor of the vehicle;

environmental air volume data detected via an air volume sensor of the vehicle;

rainfall data detected via a wiper sensor of the vehicle; and environmental temperature data detected via a temperature sensor of the vehicle;

wherein the step of determining the weather warning type comprises:

selecting a plurality of groups of environmental image sequences in the environmental video data;

determining a background object in the environmental image sequence, based on the plurality of groups of environmental image sequences; and in response to determining that at least one of the following conditions is met, determining whether the weather warning type indicates a low visibility:

an edge strength of the background object is lower than a first predetermined threshold;

an image sharpness of the background object is lower than a second predetermined threshold, and the first predetermined threshold and the second predetermined threshold are determined based on historical image data associated with the background object; and a disappearing speed of the background object in the environmental image sequence is greater than a third predetermined threshold, and the third predetermined threshold is determined based on the historical image data associated with the background object and a driving speed of the vehicle.

* * * * *